(12) United States Patent
Cervellin

(10) Patent No.: US 9,859,082 B2
(45) Date of Patent: Jan. 2, 2018

(54) DEVICE FOR CONNECTING AN ELECTRICAL CONDUCTOR HAVING AN EYELET TAG TO THE CONNECTING PAD OF A TERMINAL OF ELECTRICAL APPARATUS, AND APPARATUS INCLUDING SUCH A DEVICE

(71) Applicant: SCHNEIDER ELECTRIC INDUSTRIES SAS, Rueil Malmaison (FR)

(72) Inventor: Lucas Cervellin, Varces Allieres Et Risset (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 15/340,644

(22) Filed: Nov. 1, 2016

(65) Prior Publication Data
US 2017/0178851 A1    Jun. 22, 2017

(30) Foreign Application Priority Data
Dec. 17, 2015  (FR) .................................... 15 62584

(51) Int. Cl.
*H01R 4/28* (2006.01)
*H02B 1/04* (2006.01)
(Continued)

(52) U.S. Cl.
CPC ........... *H01H 71/08* (2013.01); *F16B 41/002* (2013.01); *H01R 11/12* (2013.01)

(58) Field of Classification Search
CPC .. H01R 13/422; H01R 13/426; H01R 13/428; H01R 4/5091; H02B 1/04; H02B 1/42
(Continued)

(56) References Cited

U.S. PATENT DOCUMENTS 5,580,286 A * 12/1996 Kramer .................... H01R 4/30
                                                           439/801
5,653,614 A *  8/1997 Eschermann ......... F16B 41/002
                                                           411/412
(Continued)

FOREIGN PATENT DOCUMENTS

EP        0 681 342 A1    11/1995
EP        0 688 063 A1    12/1995
(Continued)

OTHER PUBLICATIONS

French Preliminary Search Report dated Sep. 8, 2016 in French Application 15 62584 filed on Dec. 17, 2015 (with English Translation of Categories of Cited Documents).

*Primary Examiner* — Abdullah Riyami
*Assistant Examiner* — Thang Nguyen
(74) *Attorney, Agent, or Firm* — Oblon, McClelland, Maier & Neustadt, L.L.P.

(57) ABSTRACT

A device for connecting a conductor to a terminal, including a screw slidable inside the terminal of an apparatus, the screw having a first head portion to be actuated and screwed into a head nut and a second body portion to be screwed into a body nut mounted in a casing of the apparatus, the screw being mobile between an open position in which the screw is screwed only into the head nut so as to allow the introduction of a tag into the terminal between the screw body and a pad and a closed position in which the screw is screwed into both the body nut and the head nut so as to clamp the tag between this screw body and the pad. This device includes a device for synchronizing the threads respectively associated with the screw body and the screw head, this device ensuring automatic returning of the screw body towards the screw head when the screw body is brought into contact with the body nut during screwing until synchronization of the two threads.

8 Claims, 3 Drawing Sheets

Figure 1:
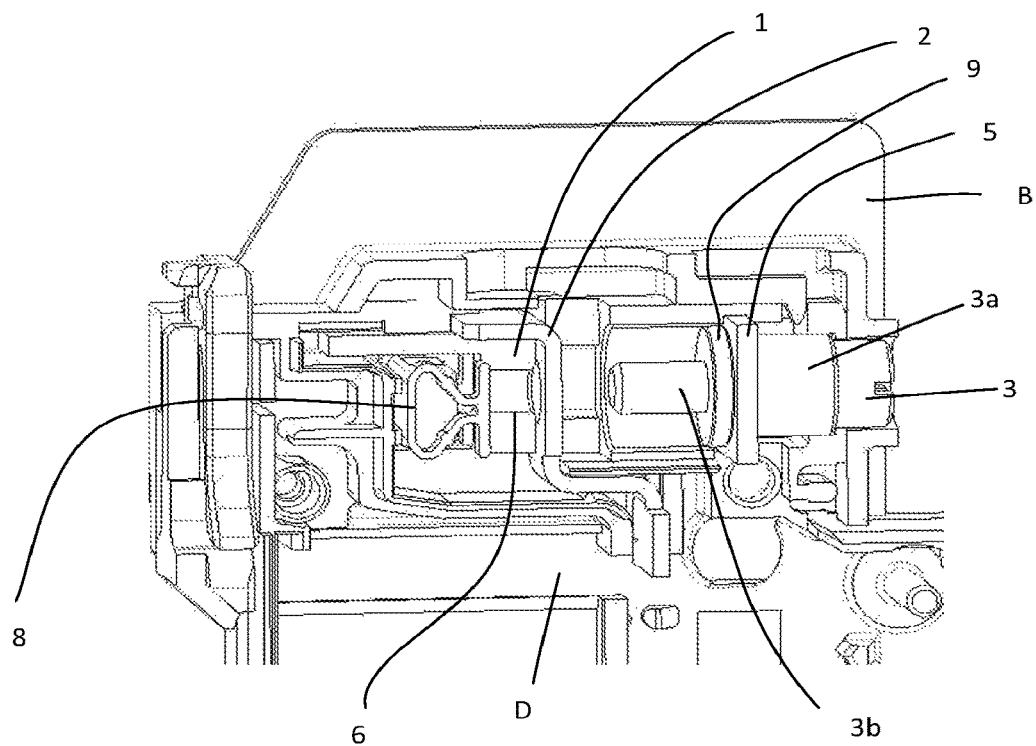

(51) Int. Cl.
  *H01H 71/08* (2006.01)
  *H01R 11/12* (2006.01)
  *F16B 41/00* (2006.01)

(58) Field of Classification Search
  USPC ........ 439/775, 776, 784, 805; 361/634, 652, 361/656
  See application file for complete search history.

(56) References Cited

U.S. PATENT DOCUMENTS

| | | | |
|---|---|---|---|
| 7,286,340 B2 * | 10/2007 | Karim | H02B 1/042 200/294 |
| 7,704,105 B2 * | 4/2010 | Bitz | H01R 4/301 439/810 |
| 8,192,238 B2 * | 6/2012 | Majewski | H01R 4/34 439/801 |
| 8,672,700 B2 * | 3/2014 | Matsumoto | H01M 2/20 439/364 |
| 2012/0052749 A1 | 3/2012 | Majewski | |
| 2015/0229065 A1 * | 8/2015 | Buehman | H02H 9/04 439/137 |

FOREIGN PATENT DOCUMENTS

| | | |
|---|---|---|
| JP | 59-134273 U | 9/1984 |
| JP | 2007-18740 | 1/2007 |

* cited by examiner

DEVICE FOR CONNECTING AN ELECTRICAL CONDUCTOR HAVING AN EYELET TAG TO THE CONNECTING PAD OF A TERMINAL OF ELECTRICAL APPARATUS, AND APPARATUS INCLUDING SUCH A DEVICE

TECHNICAL FIELD

The present invention concerns a device for connecting a conductor including a so-called eyelet tag to the connecting pad of a terminal of electrical apparatus, including a screw adapted to slide inside the terminal in a direction substantially orthogonal to the direction of insertion of the conductor in the terminal, said screw having a first so-called head portion adapted to be actuated by a user and to be screwed into a head nut and a second so-called body portion adapted to be screwed into a so-called body nut mounted in the casing of the apparatus, said screw being mobile between an open position in which the screw is screwed only into the head nut so as to allow the introduction of the tag into the terminal between the screw body and the pad and a closed position in which the screw is screwed into both the body nut and the head nut so as to clamp the tag between this screw body and the connecting pad.

PRIOR ART

Known products including these connecting devices are shipped with their terminals in the closed position. The installer therefore has to unscrew the screw completely before making the connection. Then, once entirely unscrewed, the screw is separated from the product, which then leads to the risk of dropping and losing the screw. It is then necessary to install the eyelet tag and to connect it to the pad using the screw. This may prove difficult because of the restricted space and the fact that the screw is held only by the head of the screwdriver.

SUMMARY OF THE INVENTION

The present invention solves these problems and proposes a device for connecting a conductor including an eyelet tag, that device having the advantage of including a captive screw, the product incorporating this device being able to be shipped with the connection open.

To this end, the present invention consists in a connecting device of the kind referred to above, that device being characterized in that it comprises means for synchronizing the threads respectively associated with the screw body and the screw head, these means ensuring automatic returning of the screw body towards the screw head when the screw body is brought into contact with the body nut during screwing until synchronization of the two threads According to one particular feature, the head nut is fixedly mounted in the casing B of the apparatus, whereas the body nut is adapted to be moved in a direction corresponding to the direction of screwing in the screw when that screw comes into contact with the screw body and before the synchronization of the threads.

According to another feature, these means include a spring disposed between a wall of the casing and the body nut and adapted to return said nut into its initial position after the aforementioned movement of said nut in the direction of screwing in before synchronization of the threads.

According to another feature, the two nuts are arranged relative to the screw so that, at a certain moment during screwing in, the no-load torque generated at the time of the connection is no longer composed only of friction between the screw and the body nut, this making it possible to render reliable the residual torque for the clamping of the eyelet tag, the body nut then being pressed against the pad by the spring.

According to another feature, the screw includes between the head and the body a flange adapted to have one of its radial faces come to bear on the tag in the clamping position of the screw and its opposite radial face to come to bear on the head nut during unscrewing of the screw so as to retain said screw inside the terminal in the open position.

According to another feature, the screw includes between the flange and the free end of the screw head and adjoining said flange a groove that is unthreaded, this groove making it possible to produce a disengagement making it possible to render reliable the position of the flange relative to the head nut in the maximum open position of the terminal and not to have to provide any force for screwing in.

The present invention further consists in electrical protection apparatus having the features referred to above separately or in combination.

According to one particular feature, that apparatus is a circuit-breaker.

However, other particular features and advantages of the invention will become more apparent in the following detailed description referring to the appended drawings provided by way of example only and in which:

FIGS. 1 to 6 are partial views in section showing the interior part of a terminal including a connecting device according to one particular embodiment of the invention in various screwing positions running from the open position to the closed position of the terminal, this latter position corresponding to a connected position of the conductor.

In the figures there has been represented a terminal belonging to a circuit-breaker, that terminal including a connecting device D according to one particular embodiment of the invention.

This terminal is housed in an opening 1 provided in the casing B of the apparatus, this terminal also housing an electrical connection pad 2 belonging to the apparatus.

This connecting device includes in a manner known in itself a screw 3 adapted to slide in the casing B of the apparatus in a direction substantially orthogonal to the direction of insertion of the conductor 4 into the terminal. This screw 3 includes a so-called head part 3a adapted to be screwed into a head nut 5 and a second, so-called body part 3b adapted to be screwed into a body nut 6 at the end of screwing it in, the terminal 7 being mounted around the body part 3b and adapted to be gripped between that body part 3b and the connecting pad 2. This head nut 5 is fixedly mounted relative to the casing of the apparatus whereas this body nut 6 is mounted to slide slightly relative to the casing so as to allow slight movement of this nut toward the side opposite the connecting pad.

According to the invention, this device includes respective means for synchronizing the threads provided on the two screw parts after the body part 3b is brought into contact with the body nut 6. According to one particular embodiment, these means include a spring 8 mounted in the opening 1 between a wall of the casing and the aforementioned body nut 6 so as to be able to return the body nut into its initial position after the latter has been moved by the screw 3 while bringing the screw body 3b into contact with the body nut 6 and before synchronization of the two threads.

This screw body 3b also includes a flange 9 adapted to cooperate with this head nut 5 so as to prevent the removal of the screw 3 from the terminal 7 in the open position of the terminal 7. This flange 9 advantageously has an exterior surface of partially cylindrical shape and the head nut 5 advantageously has an exterior surface of rectangular section.

This screw body 3*b* also includes, after the flange 9 on the side opposite the connecting pad 2, a groove 10 with no threads intended to enable disengagement of the screw.

The operation of a connecting device of this kind will be described hereinafter with reference to the figures.

In FIG. 1, the connecting device D is in an open position.

In this initial position, the screw 3 is unscrewed as far as possible, leaving the terminal in the open position. The groove 10 with no threads provided at the level of the flange 9 of the screw 3 enables disengagement of the screw, which therefore makes it possible to render reliable the position of the flange 9 relative to that of the head nut 5 and not to have to provide any effort for subsequently screwing it in.

Figure 2:
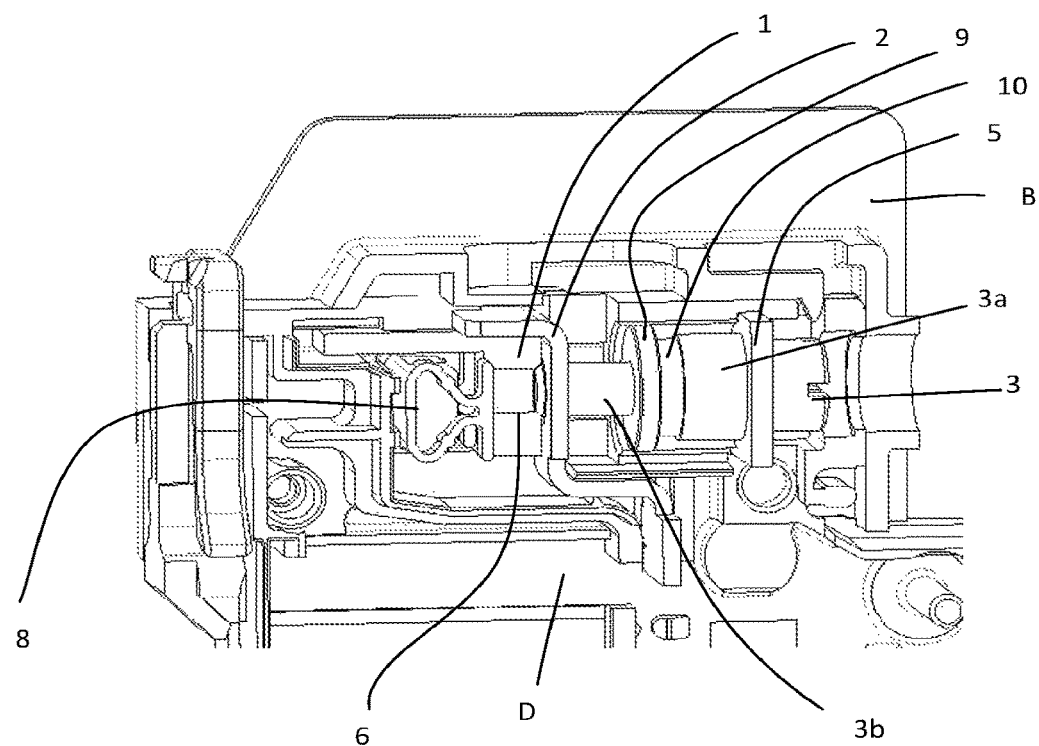

In FIG. 2, the device is in a so-called starting position. In this position, after starting to screw in the screw 3, the latter has been able to move into the interior of the head nut 5 and the screw 3 comes into contact with the body nut 6.

Figure 3:
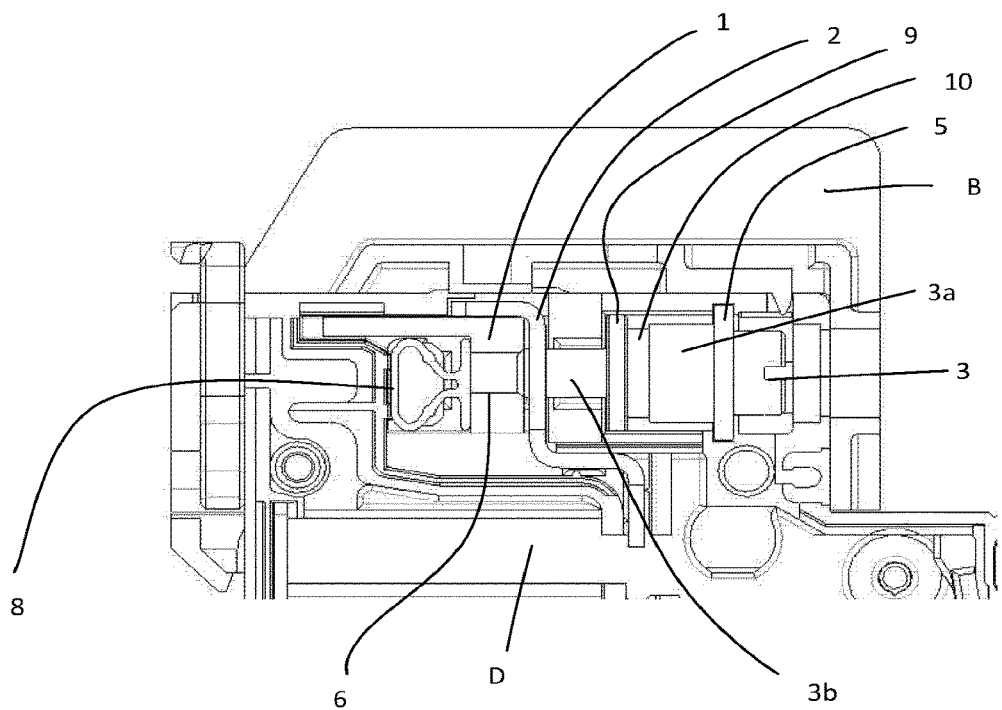

In FIG. 3, the device is in a thread synchronization position.

After establishing contact between the screw 3 and the body nut 6, for the threads of the screw to engage with those of the nut it is necessary for the thread starts to be synchronized. Now, the more the screw 3 is screwed in, the more the latter moves. This causes movement of the body nut 6 until the threads are synchronized. The spring 8 serves as a return spring in order to compensate these movements of the body nut 6 by urging the latter nut in the direction of the head 3*a* of the screw.

Figure 4:
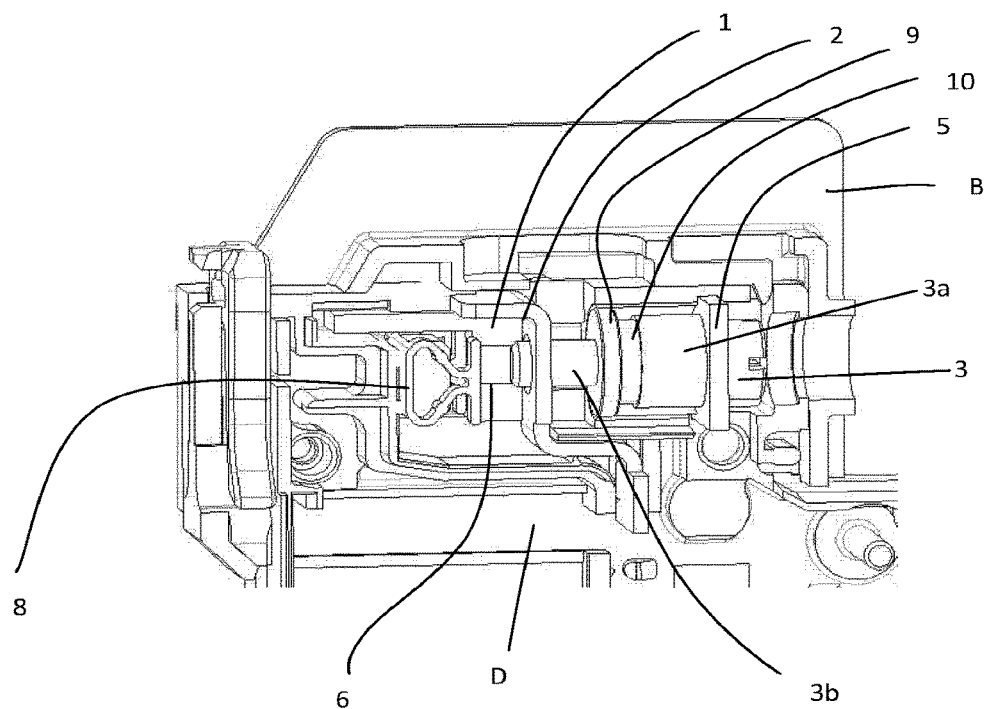

In FIG. 4, the screw 3 is in a so-called double-engagement position. In this position, once the threads have been synchronized and interengaged, the screw 3 is again in double engagement with the head nut 5 and the body nut 6 during a brief phase of movement.

The body nut 6 is still in a so-called push back position, the spring 8 still being compressed.

Figure 5:
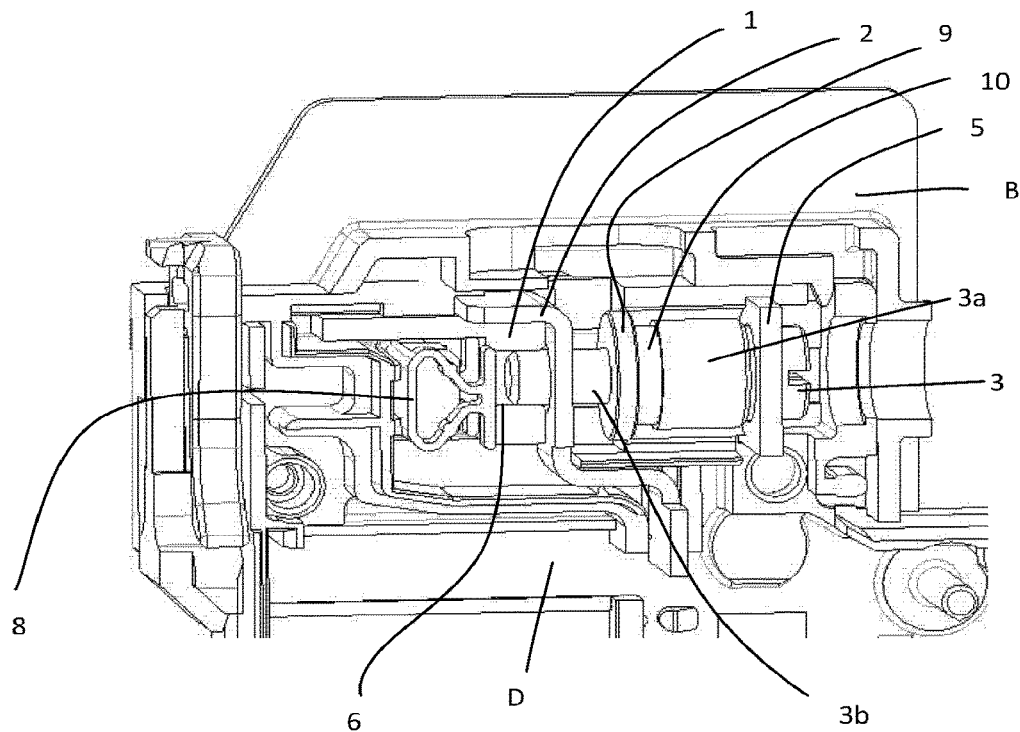

In FIG. 5, the screw is in a so-called single-engagement closed position.

At a certain moment during the tightening of the screw, the latter is disengaged from the head nut 5.

At this stage of the movement of the screw 3, the movement of the screw 3 is driven only by the coupling between the screw 3 and the body nut 6.

There no longer being any requirement for synchronization and the body nut 6 is again pressed against the pad 2 by the spring 8. In this phase, the no-load torque generated during connection is no longer made up only of friction between the screw 3 and the body nut 6, which makes it possible to render reliable the residual torque for clamping the eyelet tag 7.

Figure 6:
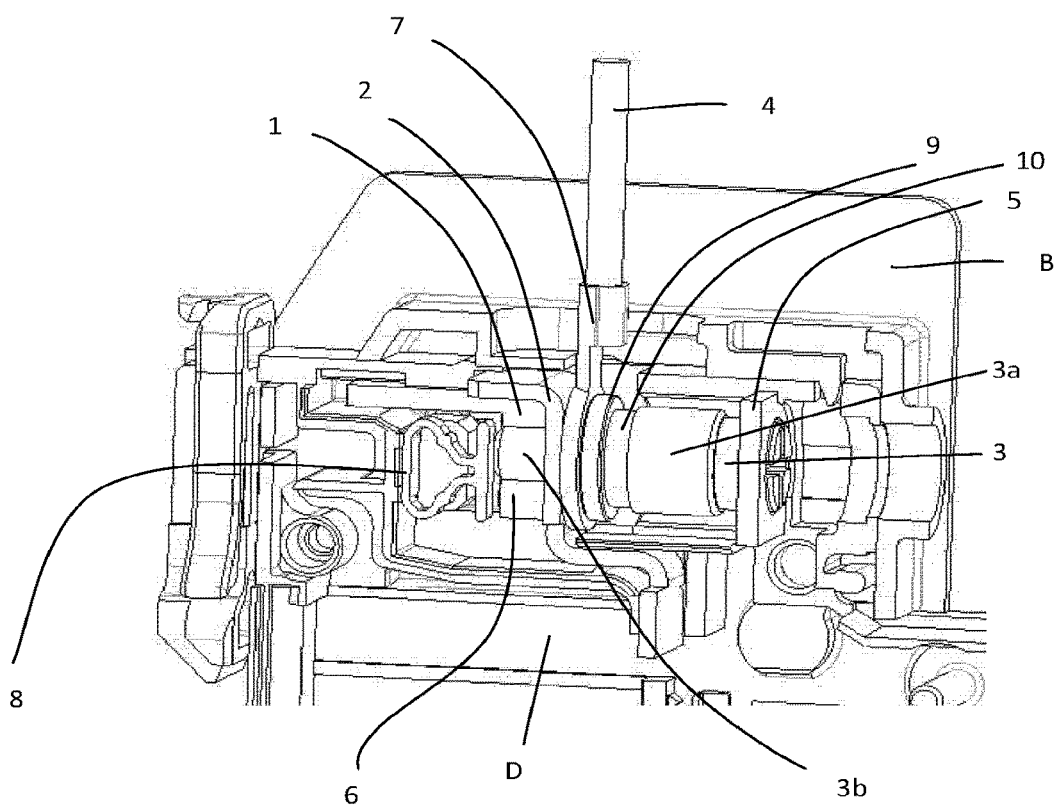

In FIG. 6, the device is in a closed position.

It will be noted that the mechanism functions in the same manner for unscrewing.

There has therefore been produced thanks to the invention a device for connecting a conductor by means of a so-called eyelet tag in electrical protection apparatus, in particular a miniature circuit-breaker, which apparatus can be shipped with its connecting device in the open position.

The invention therefore makes it possible to provide a product that is directly available for making a connection, the screw being a captive screw and retained inside the envelope.

The invention also makes it possible to disengage the screw in the completely open position of the terminal.

The invention applies to any device for connecting a conductor including an eyelet tag in electrical apparatus.

Of course, the invention is not limited to the embodiments described and shown, which are provided by way of example only.

To the contrary, the invention comprises all technical equivalents of the means described and the combinations thereof if the latter are arrived at within its spirit.

The invention claimed is:

1. A device for connecting a conductor including an eyelet tag to a connecting pad of a terminal of an electrical apparatus, the device comprising:
   a screw adapted to slide inside the terminal in a direction substantially orthogonal to a direction of insertion of the conductor in the terminal, said screw having a head portion adapted to be actuated and screwed into a head nut, and a body portion adapted to be screwed into a body nut mounted in a casing associated with the connecting device, said screw being mobile between an open position in which the screw is screwed into the head nut and not the body nut so as to allow the introduction of the eyelet tag into the terminal between the body portion of the screw and the connecting pad, and a closed position in which the screw is screwed into the body nut and not the head nut so as to clamp the eyelet tag between body portion of the screw body and the connecting pad; and
   means for synchronizing the threads respectively associated with the body portion of the screw and the head portion of the screw, said means for synchronizing the threads ensuring automatic returning of the body portion of the screw towards the head portion of the screw when the body portion of the screw is brought into contact with the body nut during screwing until synchronization of the threads.

2. The connecting device according to claim 1, wherein the head nut is fixedly mounted in the casing associated with the connecting device, whereas the body nut is adapted to be moved in a direction corresponding to a direction of screwing in the screw when that screw comes into contact with the body portion of the screw and before the synchronization of the threads.

3. The connecting device according to claim 2, wherein said means for synchronizing the threads include a spring disposed between a wall of the casing and the body nut and adapted to return said body nut into an initial position after the aforementioned movement of said body nut in the direction of screwing in before synchronization of the threads.

4. The connecting device according to claim 1, wherein the body nut and the head nut are arranged relative to the screw so that, at a certain moment during screwing in, no-load torque generated at a time of the connection is no longer composed only of friction between the screw and the body nut, whereby a residual torque for the clamping of the eyelet tag is made reliable, the body nut then being pressed against the connecting pad by a spring.

5. The connecting device according to claim 1, wherein the screw includes between the head portion thereof and the body portion thereof a flange adapted to have one radial face come to bear on the eyelet tag in the clamping position of the screw and an opposite radial face to come to bear on the head nut during unscrewing of the screw so as to retain said screw inside the terminal in the open position.

6. The connecting device according to claim 5, wherein the screw includes between the flange and a free end of the screw head and adjoining said flange, an unthreaded groove, said unthreaded groove resulting in a disengagement whereby a position of the flange relative to the head nut in a maximum open position of the terminal is made reliable, and whereby no force is required for screwing in.

7. An electrical protection apparatus comprising the connecting device according to claim 1.

8. The electrical protection apparatus according to claim 7, comprising a circuit-breaker.

* * * * *